(12) United States Patent
Lefebvre et al.

(10) Patent No.: US 9,503,467 B2
(45) Date of Patent: Nov. 22, 2016

(54) NETWORK ANOMALY DETECTION

(71) Applicant: Accenture Global Services Limited, Dublin (IE)

(72) Inventors: Michael J. Lefebvre, Arlington, VA (US); Matthew Carver, Fairfax, VA (US); Eric Ellett, Chevy Chase, MD (US); Walid Negm, Reston, VA (US); Louis William DiValentin, Fairfax, VA (US);

(Continued)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/285,487

(22) Filed: May 22, 2014

(65) Prior Publication Data

US 2015/0341379 A1 Nov. 26, 2015

(51) Int. Cl.
*H04L 29/06* (2006.01)
*H04L 12/26* (2006.01)
(Continued)

(52) U.S. Cl.
CPC ........... *H04L 63/1425* (2013.01); *H04L 41/12* (2013.01); *H04L 43/04* (2013.01); *H04L 43/0888* (2013.01);
(Continued)

(58) Field of Classification Search
USPC .......................................................... 726/22
See application file for complete search history.

(56) References Cited

U.S. PATENT DOCUMENTS 6,173,284 B1   1/2001   Brown
6,704,874 B1   3/2004   Porras
(Continued)

FOREIGN PATENT DOCUMENTS

EP   2 051 468    10/2012
JP   06250911      9/1994
(Continued)

OTHER PUBLICATIONS

A self-organized agent-based architecture for power-aware intrusion detection in wireless ad-hoc networks; Srinivasan et al; Computing & Informatics,IEEE 2006; 6 pages.*

(Continued)

*Primary Examiner* — Jason Lee
(74) *Attorney, Agent, or Firm* — Fish & Richardson P.C.

(57) ABSTRACT

Methods, systems, and apparatus, including computer programs encoded on computer storage media, for determining network related anomaly scores. One of the methods includes generating a network map including at least a plurality of network nodes and a plurality of edges that indicate communications paths between the plurality of network nodes, obtaining first data indicating network activity over the edges and between the plurality of network nodes for a first time period, generating a model of expected network activity over the edges and between the plurality of network nodes for a future time period using the network map and the first data, obtaining second data indicating network activity over the edges and between the plurality of network nodes for a second time period, and determining an anomaly score using a comparison between the second data and the model of expected network activity.

21 Claims, 7 Drawing Sheets

(72) Inventors: James J. Solderitsch, Rosemont, PA (US)

(51) Int. Cl.
  *H04W 12/08* (2009.01)
  *G06F 21/56* (2013.01)
  *H04L 12/24* (2006.01)

(52) U.S. Cl.
  CPC .......... *H04L 43/0894* (2013.01); *H04W 12/08* (2013.01); *G06F 21/566* (2013.01); *H04L 41/22* (2013.01); *H04L 63/1466* (2013.01)

(56) References Cited

U.S. PATENT DOCUMENTS

| | | |
|---|---|---|
| 7,203,693 B2 | 4/2007 | Carlbom et al. |
| 7,523,137 B2 | 4/2009 | Kass et al. |
| 8,024,795 B2 | 9/2011 | Newton |
| 8,463,790 B1 | 6/2013 | Joshi et al. |
| 8,504,879 B2 | 8/2013 | Poletto et al. |
| 8,516,104 B1 | 8/2013 | Liu et al. |
| 8,538,911 B2 | 9/2013 | Kass et al. |
| 9,118,617 B1 | 8/2015 | Giroux et al. |
| 2002/0078381 A1 | 6/2002 | Farley |
| 2003/0033318 A1 | 2/2003 | Carlbom et al. |
| 2003/0182310 A1 | 9/2003 | Charnock et al. |
| 2005/0071445 A1 | 3/2005 | Siorek |
| 2005/0114493 A1 | 5/2005 | Mandato et al. |
| 2005/0185823 A1 | 8/2005 | Brown et al. |
| 2006/0230071 A1 | 10/2006 | Kass et al. |
| 2007/0067848 A1 | 3/2007 | Gustave et al. |
| 2008/0005796 A1 | 1/2008 | Godwood |
| 2008/0109730 A1 | 5/2008 | Coffman et al. |
| 2008/0295172 A1 | 11/2008 | Bohacek |
| 2008/0307525 A1 | 12/2008 | Nickle |
| 2009/0219154 A1 | 9/2009 | Kukula |
| 2010/0071061 A1 | 3/2010 | Crovella et al. |
| 2010/0180344 A1 | 7/2010 | Malyshev |
| 2010/0223499 A1 | 9/2010 | Panigrahy |
| 2010/0254088 A1 | 10/2010 | Ishida et al. |
| 2011/0185421 A1* | 7/2011 | Wittenstein ........... G06F 21/554 726/22 |
| 2011/0185422 A1* | 7/2011 | Khayam ............. H04L 63/1425 726/23 |
| 2012/0096549 A1 | 4/2012 | Amini et al. |
| 2012/0123822 A1 | 5/2012 | Hnatio |
| 2012/0173710 A1* | 7/2012 | Rodriguez ............ H04L 43/026 709/224 |
| 2013/0019008 A1* | 1/2013 | Jorgenson ............... H04L 41/12 709/224 |
| 2013/0339341 A1 | 12/2013 | Fan et al. |
| 2014/0157405 A1* | 6/2014 | Joll ..................... H04L 63/1425 726/22 |

FOREIGN PATENT DOCUMENTS

| | | |
|---|---|---|
| WO | WO 2005/107414 | 11/2005 |
| WO | WO 2005/111805 | 11/2005 |
| WO | WO 2011/095988 | 8/2011 |
| WO | WO 2013/014672 | 1/2013 |

OTHER PUBLICATIONS

Polepeddi, "Software Vulnerability Taxonomy Consolidation," Thesis, Jan. 5, 2005, 43 pages. Retreived from the Internet: URL: http://www.osti.gov/bridge/product.biblio.jsp?osti_id=15020074 [retrieved on Nov. 2, 2007].

Extended European Search Report in Application No. 15181400.1 dated Jan. 27, 2016, 7 pages.

Anonymous: "Characterizing Malware with MAEC and STIX," [Apr. 21, 2014]. Retrieved from: URL:http://stixproject.github.io/about/Characterizing_Malware_MAEC_and_STIX_v1.0.pdf [retrieved on Dec. 7, 2015] 8 pages.

Farnham et al., "Tools and Standards for Cyber Threat Intelligence Projects," SANs Institute InfoSec Ready Room, pp. 2-21 (Oct. 14, 2013).

Extended European Search Report in Application No. 15181386.2, dated Dec. 16, 2015, 10 pages.

"Common Vulnerability Scoring System (CVSS)" wikipedia.org [online] retrieved on Jul. 15, 2015. Retrieved from the Internet: <URL: https://en.wikipedia.org/wiki/CVSS>, 8 pages.

"Common Vulnerability Scoring System v3.0: Specification Document," first.org [online]. Jun. 12, 2015 [retrieved on Jul. 15, 2015]. Retrieved from the Internet: <URL: https://www.first.org/cvss/cvss-v30-specification-v1.4.pdf>, 19 pages.

"Protect Your PEO," crowdstrike.com [online] retrieved on Jul. 15, 2015. Retrieved from the Internet: <URL: http://www.crowdstrike.com>, 2 pages.

"The KBMS—Prototype KRISYS User Manual" Dec. 1992, p. 1-94.

Accenture, "Discover What Your Customers Really Think," 2 pages, Accenture 2005.

Allan et al.: "Taking Topic Detection From Evaluation to Practice" Proceedings of The 38th International Conference on System Sciences, Jan. 3, 2005, 10 pages.

Barnum, "Standardizing cyber threat intelligence information with the structured threat information eXpression (STIX)," Version 1.1; Revision 1, MITRE, Feb. 2014, 22 pages.

Bird and Loper, "NLTK: The Natural Language Toolkit," Proceedings of the ACL demonstration session, Barcelona, Association for Computational Linguistics, pp. 214-217. Jul. 2004.

Bird, "NLTK-Lite: Efficient Scripting for Natural Language Processing," Proceedings of the 4th International Conference on Natural Language Processing (ICON). pp. 11-18, Kanpur, India. New Delhi: Allied Publishers. Dec. 2005.

Birnbaum et al., "Analogy, Intelligent IR, and Knowledge Integration for Intelligence Analysis" Ai Technologies for Homeland Security, Papers From The 2005 Aaai Spring Symposium, Mar. 21, 2005, XP002390865 Menlo Park, CA Retrieved from the Internet: URL:http://www.infolab.northwestern.edu/infolab/downloads/papers/paper10142.pdf> [retrieved on Jul. 19, 2006], 6 pages (Search Report).

Bloglines, Create a Personal Bloglines Page Loaded with the Freshest News About the Things You Love, 1p., 2003.

Chung and Mcleod: "Dynamic Topic Mining from News stream Data" COOPIS/DOA/ODBASE 2003, [Online] 2003, pp. 653-670, XP002391208 Retrieved from the Internet:URL:http://www.springerlink.com/(zb2dxr55xIjuq5453e2bnj55)/app/home/contribution.asp?referrer=parent&backto=issue,42,95 journal,1127,3908;linkingpublicationresults,1:10 5633,1> [retrieved on Jul. 19, 2006].

ClearforestText-Driven Business Intelligence, ClearForest Tagging & Extraction Platform, 2 pages, 2006.

Genalytics, Inc., "Building Next Generation Predictive Models Using Genetic Algorithm-based Software," <URL: http://genalytics.com>, 27 pages, 2003.

Genalytics, Inc., "Genalytics Auto: List Management Solution for Driving Successful Campaigns," 2 pages, 2006.

Genalytics, Inc., "Genalytics DB Extract: Advanced Data Extraction, Transformation and Scoring for Enterprise Data," 2 pages, 2006.

Genalytics, Inc., "Genalytics Knowledge Extract: Extract Meaning from Your Uninstructed Data," 2 pages, 2004.

Genalytics, Inc., "Genalytics Model, Leverage More Data, Create Better Models," 2 pages, 2006.

Genalytics, Inc., "Genalytics Phone: Phone Append our Reverse Look Up to Validate or Target your Prospects," 1 page, 2005.

Genalytics, Inc., "Genalytics Prospect, Automated Analytics and Targeted Analytics and Targeted Lists," 1 page, 2006.

Genalytics, Inc., "Taming the Analytic Data Monster: An Advanced Approach to Data Extraction and Transformation for Enterprise Analytics," 12 pages, 2004.

Intelliseek, Brandpulse Products, BrandPulse 360™, 2 pages 1997-2006.

Intelliseek, Brandpulse Products, BrandPulse CRM™, 2 pages, 1997-2006.

(56) References Cited

OTHER PUBLICATIONS

Intelliseek, Brandpulse Products, BrandPulse Internet™, 2 pages, 1997-2006.
Intelliseek, Brandpulse Products, BrandPulse™ Direct, 2 pages, 1997-2006.
Intelliseek, Brandpulse Products, BrandPulse™ Overview, 2 pages, 1997-2006.
Inxight, "Inxight SmartDiscovery® Analysis Adapters and Connectors," 2 pages, Inxight Software Inc., 2005.
Inxight, "Inxight SmartDiscovery™ The Complete Solution for Enterprise Information Discovery," <URL:www.inxight.com> 4 pages, 2005.
Inxight, "Inxight ThingFinder Advanced with Custom Entity Extraction," 1 page, 2006.
Liu and Singh, "ConceptNet—a practical commonsense reasoning tool-kit" Bt Technol J; Bt Technology Journal Oct. 2004, [Online] vol. 22, No. 4, Oct. 2004, pp. 211-226, XP002391209. Retrieved from the Internet: URL:http://web.media.mit.edu/{push/Concept Net-BTTJ.pdf> [retrieved on Jul. 19, 2006].
Loper and Bird, "NLTK: The Natural Language Toolkit," Proceedings of the ACL Workshop on Effective Tools and Methodologies for Teaching Natural Language Processing and Computational Linguistics, Philadelphia, Association for Computational Linguistics, pp. 62-69. Jul. 2002.
Makkonen, "Investigations on Event Evolution in TDT" CITESEER, [Online] 2003, XP002391206. Retrieved From The Internet: URL:Http://Citeseer.Ist.Psu.Edu/706354.Htm 1> [Retrieved on Jul. 19, 2006], 6 pages.
McCallum, "Bow: A Toolkit for Statistical Language Modeling, Text Retrieval Classification and Clustering," 2 pages, Sep. 12, 1998.
McCallum, "Rainbow," 6 pages, Sep. 30, 1998.
Nallapati et al., "Event threading within news topics" Proceedings of The Thirteenth Acm Conference on Information and Knowledge Management (CIKM), [Online] 2004, pp. 446-453, XP002390646. Retrieved from the Internet: URL:http://www.cs.umass.edu/{nmramesh/p425-nallapati .pdf> [retrieved on Jul. 19, 2006].
Soderland, "Learning information extraction rules for semi-structured and free text" Machine Learning Kluwer Academic Publishers Netherlands, [Online] vol. 34, No. 1-3, Feb. 1999, pp. 233-272, XP002391210, ISSN: 0885-6125. Retrieved from the Internet: URL:http://www.springerlink.com/media/f62clcrrlncvnj23recn/contributions/m/2/3/n/m23n8197vg924t51.pdf> [retrieved on Jul. 19, 2006].
STIX, "Structured Threat Information eXpression—STIX—A structured language for cyber threat intelligence information," MITRE, <URL: https://stix.mitre.org>, Jul. 2013, 2 pages.
Technorati™, "About Technorati, Currently Tracking 31 Million Sites and 2.2 Billion links," 1 page, 2006.
Yahoo! Inc., "Imagine all your favorite things on one page. That's My Yahoo!" www.yahoo.com. Sign in, 1page, 2006.
Yang et al., "Learning approaches for detecting and tracking news events" IEEE Intelligent Systems, [Online] vol. 14, No. 4, 1999, pp. 32-43, XP002391207. Retrieved from the Internet: URL:http://ieeexplore.ieee.org/iel5/5254/17016/00784083.pdf?tp=&arnumber=784083&isnumber=17016> [retrieved on Jul. 19, 2006].
Canadian first Examiner's Report for Application No. 2,602,564 dated Mar. 1, 2013, 2 pages.
European Patent Office dated Dec. 18, 2007 for co-pending European Patent Office Application No. 07253957.0, 8 pages.
European Patent Office dated Feb. 4, 2008 for co-pending European Patent Office Application No. 06 742 600.7, 3 pages.
Extended European Search Report in Application No. 15168872.8, dated Oct. 20, 2015, 6 pages.
Office action in AU Application No. 2015202706, issued Oct. 30, 2015, 3 pages.
PCT International Preliminary Report on Patentability for Application No. PCT/EP2006/003533 dated Oct. 18, 2007, 13 pages.
PCT Notification of Transmittal of the International Search Report and the Written Opinion for International Application No. PCT/EP2006/003533 dated Sep. 8, 2006, 18 pages.
U.S. Appl. No. 13/975,993, "Identifying and classifying non-functional requirements in text," Aug. 26, 2013, 56 pages.
U.S. Final Office Action for U.S. Appl. No. 11/387,173 dated Aug. 14, 2008, 16 pages.
U.S. Final Office Action for U.S. Appl. No. 12/405,026 dated Dec. 12, 2011, 21 pages.
U.S. Non-Final Office Action for U.S. Appl. No. 11/387,173 dated Feb. 22, 2008, 16 pages.
U.S. Non-Final Office Action for U.S. Appl. No. 12/405,026 dated May 4, 2011, 19 pages.
U.S. Non-Final Office Action for U.S. Appl. No. 14/473,730 dated Aug. 23, 2015, 29 pages.
U.S. Notice of Allowance for U.S Appl. No. 11/387,173 dated Dec. 12, 2008, 19 pages.
U.S. Notice of Allowance for U.S. Appl. No. 12/405,026 dated Apr. 25, 2012, 13 pages.
U.S. Notice of Allowance for U.S. Appl. No. 12/405,026 dated Jun. 12, 2013, 21 pages.
Office Action in AU Application No. 2015202706, issued Mar. 8, 2016, 2 pages.
U.S. Non-Final Office Action for U.S. Appl. No. 14/473,743, dated Aug. 18, 2016, 18 pages.
U.S. Notice of Allowance for U.S. Appl. No. 14/473,730, dated Mar. 1, 2016, 9 pages.

\* cited by examiner

NETWORK ANOMALY DETECTION

BACKGROUND

A network firewall, or another device, can determine which types of network traffic to allow on a network and which types of network traffic to block by applying computer-implemented logic to the network traffic. Optimally, the computer-implemented logic as implemented by the network firewall will lower a likelihood of the network being compromised by malicious activity. The computer-implemented logic may represent computer-implemented network rules or implement organizational policies to prevent unauthorized access to particular types of content, such as social media.

SUMMARY

In general, one innovative aspect of the subject matter described in this specification can be embodied in methods that include the actions of generating, by one or more computers, a network map including at least a plurality of network nodes and a plurality of edges that indicate communications paths between the plurality of network nodes, obtaining, by at least one of the one or more computers, network node information including an indication of a node type for each of the plurality of network nodes and network activity data indicating typical network activity for each of the node types, obtaining, by at least one of the one or more computers, first data indicating network activity over the edges and between the plurality of network nodes for a first time period, generating, by at least one of the one or more computers, a model of expected network activity over the edges and between the plurality of network nodes for a future time period using the network map, the network node information, and the first data, obtaining, by at least one of the one or more computers, second data indicating network activity over the edges and between the plurality of network nodes for a second time period, and determining, by at least one of the one or more computers, a node anomaly score for each of at least some of the plurality of network nodes using a comparison between the second data and the model of expected network activity. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining the node anomaly score for each of at least some of the plurality of network nodes may include determining, by at least one of the one or more computers and for a particular network node from the plurality of network nodes, an edge anomaly score for each of the edges between the particular network node and the other nodes in the plurality of network nodes that have communications paths with the particular network node, and aggregating the edge anomaly scores for each edge connected to the particular network node to determine the node anomaly score for the particular network node. Aggregating the edge anomaly scores for each edge connected to the particular network node to determine the node anomaly score may include aggregating the edge anomaly scores using Bayesian inference.

In some implementations, using the comparison between the second data and the model of expected network activity includes determining whether the second data indicates that a given network node is sending larger packets or using different network protocols than the model of expected network activity indicates for the given network node. The first time period, the future time period, and the second time period may have the same length, e.g., thirty seconds. The method may include presenting the node anomaly score on a display.

In some implementations, the method includes determining whether a particular node anomaly score for a particular network node is greater than a threshold anomaly score. The method may include automatically sending an event message upon determining that the particular node anomaly score for the particular network node is greater than the threshold anomaly score. The method may include receiving a reply to the event message that indicates one or more actions to perform in response determining that to the particular node anomaly score for the particular network node is greater than the threshold anomaly score. The method may include performing at least one of the actions with respect to the particular node that corresponds with the particular node anomaly score. The method may include automatically performing at least one action with respect to the particular network node in response to determining that the particular node anomaly score for the particular network node is greater than the threshold anomaly score. The at least one of the actions may include at least one of presenting information to a user about the particular network node, sending an event message about the particular network node, disconnecting the particular network node from a network, restricting inbound or outbound bandwidth of the particular network node, preventing the particular network node from sending or receiving particular types of network traffic, rerouting network traffic that has the particular network node as a destination, quarantining the particular network node, disabling the particular network node, creating a computer-implemented network rule for the particular network node, silently discarding at least some of the network traffic corresponding to the particular network node, transitioning an application executing on the particular network node to another network node, or blocking network traffic that has the particular network node as a destination.

In some implementations, determining the node anomaly score for each of at least some of the plurality of network nodes may include determining, by at least one of the one or more computers and for a particular network node from the plurality of network nodes, a standard deviation of a packet size or a packet quantity of the particular network node using the model of expected network activity, and determining the node anomaly score for the particular network node using the standard deviation and the second data. The method may include aggregating the node anomaly scores for each node in a particular network or a particular subnet to determine a network anomaly score for the particular network or a subnet anomaly score for the particular subnet.

In general, one innovative aspect of the subject matter described in this specification can be embodied in methods that include the actions of generating, by at least one of one or more computers, a network map comprising at least a plurality of network nodes and a plurality of edges that indicate communications paths between the plurality of network nodes, obtaining, by at least one of the one or more computers, network node information comprising an indication of a node type for each of the plurality of network nodes and network activity data indicating typical network activity for each of the node types, obtaining, by at least one of the one or more computers, first data indicating network activity over the edges and between the plurality of network nodes for a first time period, generating, by at least one of the one or more computers, a model of expected network activity over the edges and between the plurality of network nodes for a future time period using the network map, the network node information, and the first data, obtaining, by the monitoring device included in the one or more computers and via a communications interface included in the monitoring device, second data indicating network activity over the edges and between the plurality of network nodes for a second time period, and determining, by the monitoring device, an edge anomaly score for each of at least some of the plurality of edges using a comparison between the second data and the model of expected network activity. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include aggregating the edge anomaly scores for each edge connected to a particular network node to determine a node anomaly score for the particular network node. The method may include comparing the node anomaly score with a threshold anomaly score, and automatically sending an event message upon determining that the node anomaly score is greater than the threshold anomaly score. Determining the edge anomaly score for at least some of the plurality of edges may include determining, by at least one of the one or more computers and for a particular edge from the plurality of edges, a standard deviation of a packet size or a packet quantity of the particular edge using the model of expected network activity, and determining the edge anomaly score for the particular edge using the standard deviation and the second data.

In some implementations, the monitoring device obtains at least some of the second data via the communications interface from a logical or physical interface of another device that mirrors a copy of at least some network traffic that passes through the other device to the monitoring device. The logical or physical may include comprises a span port. The one or more computers may obtain at least some of the first data from the logical or physical interface of the other device that mirrors a copy of at least some network traffic that passes through the other device to the monitoring device.

In some implementations, the method includes determining, by the monitoring device, whether a connection, that corresponds with the edge anomaly score and between a node and another node with which the node does not normally communicate, indicates that the node sent packets to or received packets from the other node, and determining the edge anomaly score using the determination whether the connection indicates that the node sent packets to or received packets from the other node with which the node does not normally communicate. The method may include determining, by the monitoring device, whether a connection, that corresponds with the edge anomaly score, typically transfers a specific type of packet, based on the first data, and recently transferred another type of packet, based on the second data, and determining the edge anomaly score using the determination whether the connection typically transfers the specific type of packet, based on the first data, and recently transferred the other type of packet, based on the second data. The specific type of packet may include an unencrypted packet and the other type of packet may include an encrypted packet.

The subject matter described in this specification can be implemented in particular embodiments so as to realize one or more of the following advantages. In some implementations, a monitoring device analyzes connections between devices to identify new connections or changes in connections that are different than expected network activity for those connections and may represent malicious activity or changes in device operation, e.g., based on configuration or operational changes. In some implementations, anomaly scores may be used to determine or update an understanding of a network device operating environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A monitoring device may detect anomalous network traffic, e.g., in near real-time, by comparing current network activity of devices on a network to expected network activity of those devices. The detection of anomalous network traffic may indicate malicious communication with a device that should be stopped, e.g., a virus or unauthorized access to the device. The expected network activity of a device may be determined using a device type, data indicating typical traffic for that type of device, and prior network activity of the device, e.g., observed by the monitoring device.

Upon detection of anomalous network traffic for a particular device, the monitoring device may execute a computer-implemented network rule or perform another action to reduce the likelihood of future anomalous network traffic for the particular device. For example, the monitoring device may alert a user, e.g., by presenting information to the user about the anomalous network traffic, disconnecting the particular device from the network, restricting inbound or outbound bandwidth of the device, preventing the particular device from sending or receiving particular types of network traffic, rerouting network traffic that has the particular device as a destination, or blocking network traffic that has the particular device as a destination.

Some examples of anomalous activity may include devices that communicate with each other that have not communicated in the past, or devices that send or receive larger packets than usual, packets using different protocols than expected, or communicating on different ports than expected.

Figure 1:
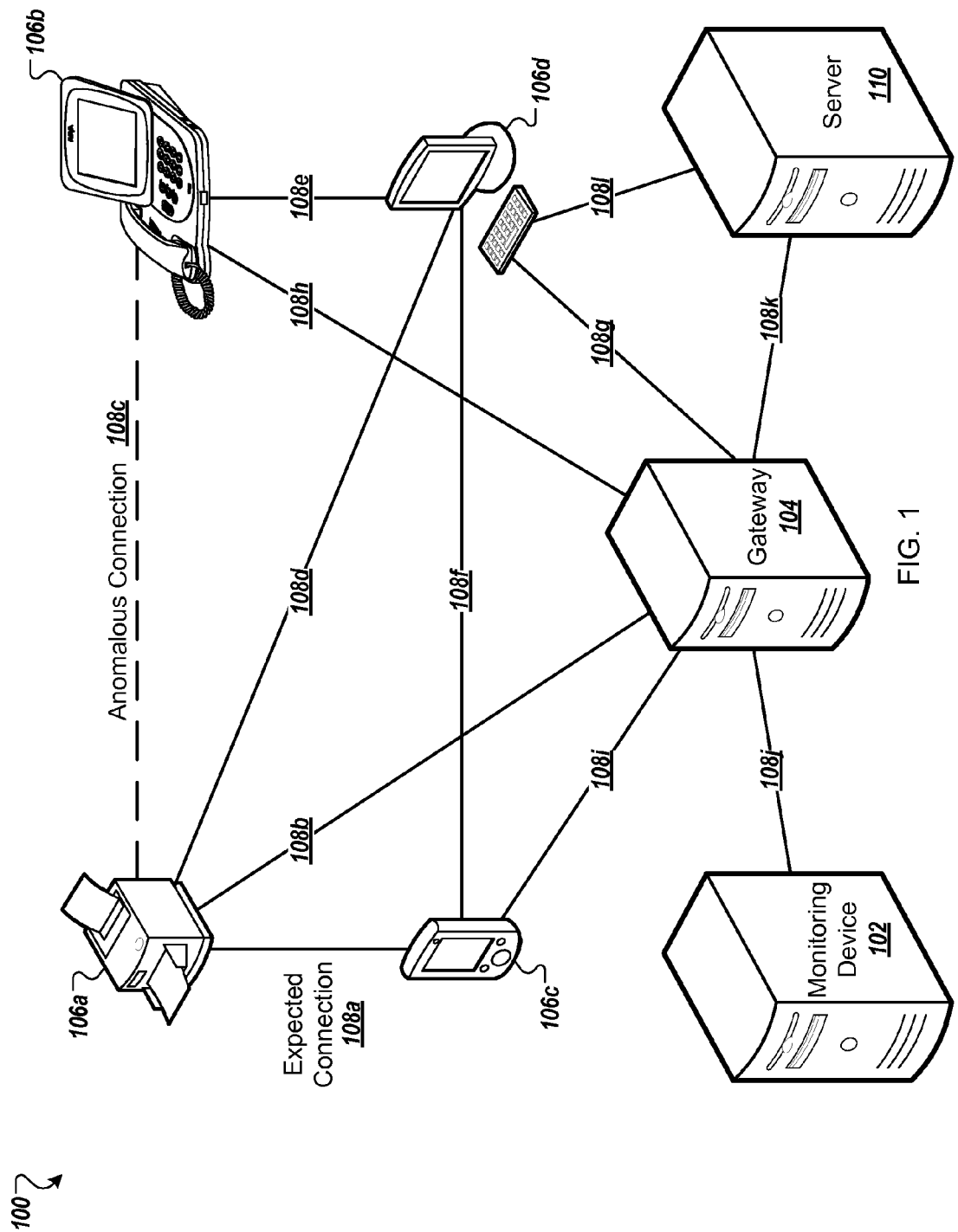
FIG. 1 is an example of an environment in which a monitoring device analyzes network traffic received from a gateway.

FIG. 1 is an example of an environment 100 in which a monitoring device 102 analyzes network traffic received from a gateway 104. The gateway 104 may be a gateway, a switch, a hub, a proxy server, or an intrusion prevention system, to name a few examples of devices that mirror data to the monitoring device 102. The monitoring device 102 creates a network model of the environment 100 that includes a collection of nodes, each node representing one of multiple network devices 106a-d, e.g., by their Internet Protocol (IP) version 4 addresses, and edges 108a j, representing connections between the network devices 106a-d. Although IP addresses are used in FIG. 1, any identifying legend for devices could be employed, such as network names, media access control (MAC) addresses, hardware addresses, proprietary addresses, or another version of Internet Protocol addresses, e.g., version 6.

The network model may represent logical connections or physical connections between the network devices 106a-d, the gateway 104, and the monitoring device 102. In FIG. 1, the network model represents the logical connections between the devices. For instance, the network devices 106a-d may be connected, e.g., with a wire or wirelessly, to the gateway 104 and communicate with the other network devices 106a-d as represented by the edges 108a-i.

A connection may represent communication between two or more devices when those devices are the original source or the final destination of communications across the connection. For example, when a desktop device 106d sends a document to a printer 106a, through a gateway or a switch, the network model includes an edge 108d for the connection between the desktop device 106d and the printer 106a, but does not include the gateway or the switch in the connection represented by the edge 108d.

A connection may be bidirectional or unidirectional. For example, a particular edge 108d may indicate that the desktop device 106d sends data to the printer 106a but does not receive data from the printer 106a, and is unidirectional. Another connection may indicate that the printer 106a sends data to the desktop device 106d, but less frequently and with smaller packet sizes. In some examples, a bidirectional connection may indicate that more network traffic flows in one direction, from the desktop device 106d to the printer 106a, than the other direction.

The monitoring device 102 generates an edge anomaly score for each of the edges 108a-i that represents a probability that the corresponding connection is anomalous. The monitoring device 102 may aggregate the edge anomaly scores for all of the edges connected to a particular device to determine a node anomaly score for the particular device. For instance, when the monitoring device 102 determines a node anomaly score for a desktop device 106d, the monitoring device 102 aggregates the edge anomaly scores for the edges 108d-g. In this example, all of the edges representing connections with the desktop device 106d are expected connections, represented by the solid lines of the edges, and the desktop device 106d receives a low node anomaly score.

Similarly, when the monitoring device 102 determines another node anomaly score for a printer 106a, the monitoring device aggregates the edge anomaly scores for the edges 108a-d. The edge 108c indicates an anomalous connection between the printer 106a and an IP phone 106b. For instance, an attacker may create a secure shell (SSH) connection between the printer 106a and the IP phone 106b to gain access to other devices in the environment 100. The monitoring device 102 assigns the printer 106a a high node anomaly score because of the anomalous connection 108c.

In some implementations, the monitoring device 102 may aggregate node anomaly scores to generate a network anomaly score for a particular logical or physical network or a particular subnet in the environment 100. The network anomaly score represents the total anomalous activity on the particular network or subset and, when the monitoring device or another device determines that the network anomaly score is high, the monitoring device or the other device may take appropriate action, such as disconnecting the particular network or subnet, restricting inbound or outbound bandwidth of the particular network or subnet, or activating a computer-implemented network rule for the network communications of all devices in the particular network or subnet.

In some examples, the network model includes an edge 108j between the monitoring device 102 and the gateway 104 that may be used by the monitoring device 102 to determine a node anomaly score for the gateway 104 and/or the monitoring device 102. In some implementations, the network model does not include the edge 108j because the connection between the gateway 104 and the monitoring device 102 includes a copy of all network data from the environment 100, e.g., including any anomalous network data for the devices 106a-d, which may cause a false detection of anomalous network activity between the gateway 104 and the monitoring device 102, e.g., when the gateway 104 mirrors network traffic to the monitoring device 102.

In some implementations, the environment 100 may include one or more servers 110 with edges 108k-1 that represent connections with one or more of the network devices 106a-d and/or the gateway 104. For instance, the network devices 106a-d and the gateway 104 may connect with each other using a first network, e.g., a local area network, and the server 110 may connect to the network devices 106a-d through the gateway 104 and be located on another network, e.g., the Internet. The edges 108k-1 may represent a request for data from the server 110 or an attack on the gateway 104 or the desktop device 106d by the server 110, depending on the type of data transferred across the connections represented by the edges 108k-1, to name a few examples.

Figure 2:
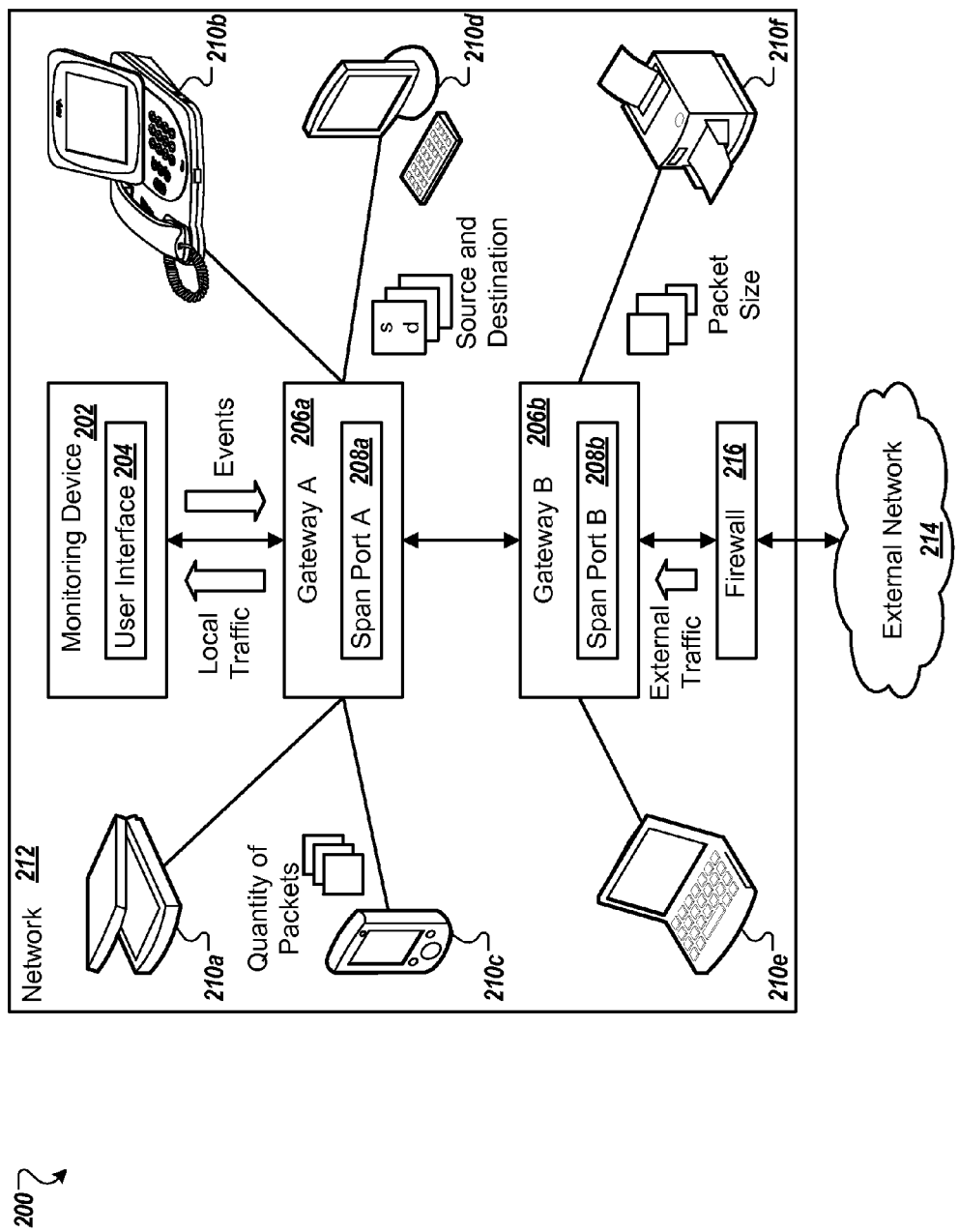
FIG. 2 is an example of a system in which a monitoring device analyzes network activity.

FIG. 2 is an example of a system 200 in which a monitoring device 202 analyzes network activity. The monitoring device 202 may present information about the analyzed network activity in a user interface 204, e.g., to a user. For instance, the monitoring device 202 receives local traffic, e.g., network packets, from multiple gateways 206a-b, via a communications interface, and compares the local traffic to a network model to determine whether the network traffic is indicative of anomalous network activity. The communications interface may be an Ethernet port or another appropriate type of connection that allows the monitoring device 202 to send data to and receive data from the gateways 206a-b.

Each of the gateways 206a-b includes a span port 208a-b or other logical or physical interface that mirrors a copy of network traffic that passes through the gateways 206a-b to the monitoring device 202. The gateways 206a-b do not mirror, to the monitoring device 202, network traffic that includes the monitoring device 202 as a source or as a destination. The gateways 206a-b may use the span ports 208a-b to mirror only traffic that has an end destination and/or source destination connected directly to the respective gateway. For instance, the gateway A 206a may mirror the traffic that is going to or from multiple devices 210a-d connected directly to the gateway A 206a, and the gateway B 206b may mirror traffic that is going to or from multiple devices 210e-f connected directly to the gateway B 206b.

Mirroring of only traffic that has an end destination or source connected directly to the respective gateway may reduce the chance that the same network traffic is sent to the monitoring device 202 multiple times while ensuring that all, or a specific subset of all, network traffic is sent to the monitoring device 202 for analysis. For example, only local traffic with both a source and a destination in a network 212 may be sent to the monitoring device.

In some examples, the monitoring device 202 may analyze network traffic with a source or destination that is outside of the network 212, e.g., and one of the source or destination is in an external network 214. In these examples, a firewall 216 may mirror some or all of the external network traffic to the monitoring device 202. The firewall 216 may mirror traffic received from the external network 214 to the monitoring device 202 while the gateways 206a-b mirror traffic with a destination in the external network 214 to the monitoring device 202. The firewall 216 may mirror all external network traffic, with either a source or a destination, to the monitoring device 202. In some examples, the gateway B 206b mirrors the external traffic, using the span port B 208b, to the monitoring device 202.

In some implementations, the monitoring device 202 analyzes only inbound or only outbound network traffic. For instance, the monitoring device 202 analyzes inbound network traffic to determine whether the inbound network traffic is representative of an attack on one of the devices 210a-f or the gateways 206a-b. In some examples the monitoring device 202 may analyze outbound network traffic to determine whether a particular device, e.g., one of the devices 210a-f or the gateways 206a-b, has been compromised and is a source of malicious network activity.

The monitoring device 202 may use any appropriate algorithm to de-duplicate the network traffic received from the gateways 206a-b and/or the firewall 216, e.g., so that the monitoring device 202 analyzes each distinct packet only once. Some exemplary algorithms to de-duplicate the network traffic may include having only the gateway 206a-b closest to the destination device mirror a packet to the monitoring device 202, the monitoring device 202 using a checksum to determine whether two packets are identical, and/or having a device, e.g., one of the gateways 206a-b or the firewall 216, that is closest to the source of a packet mirror the packet to the monitoring device.

The monitoring device 202 calculates edge anomaly scores for each network connection for the devices 210a-f. Each of the edge anomaly scores may represent a probability that the corresponding connection is anomalous for the respective devices, e.g., the two or more devices that correspond with the connection.

The monitoring device 202 may use real network data to build a network model, e.g., using machine learning, that the monitoring device 202 can use to categorize individual connections and/or all connections in a time period as either normal or anomalous and determine the corresponding edge anomaly scores. In some examples, the monitoring device 202 may use a probabilistic approach to categorize individual connections and/or all connections and determine the corresponding edge anomaly scores.

The network model defines a probability distribution of anomalous activity for each connection in the system 200 based on the normal traffic over that connection, e.g., between the devices that use that connection. The probability distributions may be defined using a simulation of the system 200 and/or using real data, e.g., including the real network attack data.

The monitoring device 202 may collect network traffic and use the network model and the collected network traffic to assign a probability value to each connection for a particular time period, such as one between five (5) seconds and one-hundred twenty (120) seconds. Preferably, and without limitation, a thirty (30) second period of time is used. The probability value may represent the likelihood of a particular property of the connection, such as the likelihood that a particular quantity of network communication packets sent across the connection during the particular time period is malicious or the likelihood that specific packet sizes or a specific total packet size that cross(es) the connection during the particular time period are malicious.

For traffic that is highly irregular, given the network model, the monitoring device 202 will assign the corresponding connection a high edge anomaly score. For edge traffic that looks normal, given the network model, the monitoring device will assign the corresponding connection a low edge anomaly score.

The time periods analyzed by the monitoring device 202 may be overlapping, e.g., moving windows of thirty second time periods. The time periods may be non-overlapping, e.g., distinct windows of thirty second time periods with the network traffic for each window corresponding to only a single anomaly score.

The monitoring device 202 may use any appropriate algorithm to categorize one or more connections, e.g., as having a high edge anomaly score or a low edge anomaly score. For instance, modules included in the monitoring device 202, e.g., used to categorize connections, can be modular to allow replacement with a different module that uses a different model, set of models, and/or probabilistic forecasts. One requirement for the module may be that the module outputs a probability, e.g., between zero and one, that represents the degree to which a connection or activity on a connection is anomalous.

In some implementations, a score of one represents a low anomaly score and a score of zero represents a high anomaly score and a high probability of anomalous network activity. In some implementations, a score of one represents a high anomaly score and a score of zero represents a low anomaly score. Scores between zero and one may represent various ranges in anomaly scores between high and low, e.g., and corresponding probabilities of anomalous network activity. The monitoring device 202 may use any appropriate values for the high and the low anomaly scores.

The monitoring device 202 may analyze a quantity of network communication packets, a packet size, and/or source and destination addresses to determine an edge anomaly score for a connection. If a quantity of network communication packets across a connection between two devices is higher than normal, as represented by the network model, the monitoring device 202 may assign the connection a high edge anomaly score. For instance, if the quantity is greater than a threshold variation from the average quantity indicated by the network model, the monitoring device 202 may assign a high edge anomaly score. The monitoring device 202 may use any appropriate address, e.g., MAC address, IP address, hardware addresses, or proprietary addresses, or identifier for the devices 210a-f when analyzing network traffic.

If a size of packets sent across a connection, e.g., an average size, median size, and/or standard deviation in the packet size over a period of time, varies from a size indicated in the network model by more than a threshold value, the monitoring device 202 may assign the connection a high edge anomaly score. The threshold variations may be a standard deviation, or a multiple of the standard deviation, of the average quantity of network communication packets indicated by the network model. If a connection is created between two or more devices that typically do not communicate, such as a printer and a telephone, e.g., represented by source and destination addresses, the monitoring device 202 may assign the connection a high edge anomaly score.

The monitoring device 202 may then present the edge anomaly scores to a user, e.g., on a display, or use the edge anomaly scores to calculate node anomaly scores for some of the devices 210a-f. For instance, the monitoring device 202 may use machine learning or a Bayesian Inference Network to calculate a node anomaly score for a device using the edge anomaly scores for each of the connections that include the device, e.g., as a source or a destination in the connection.

When using a Bayesian Inference Network for the network model to determine node anomaly scores, the monitoring device 202 may receive an initial probability of attack set from a user and condition the probability of attack set for a particular device using all of the edge anomaly scores for connections that include the particular device. For instance, the monitoring device 202 identifies an initial node anomaly score, e.g., anomalous activity probability, for a particular device and uses the edge anomaly scores for the connections that include that particular device to adjust the initial node anomaly score up or down. If a large number of connections that include the particular device are anomalous and have high edge anomaly scores, the monitoring device 202 adjusts the node anomaly score for the particular device up. If few or none of the connections that include the particular device are anomalous and most of the connections have low edge anomaly scores, the monitoring device 202 adjusts the node anomaly score for the particular device down. In some examples, the monitoring device 202 adjusts a node anomaly score down only when all connections that include the particular device have low edge anomaly scores.

When using machine learning, the monitoring device 202 may initiate a network model using a Bayesian Inference Network. After initialization of a network model, the monitoring device 202 may adjust the network model with machine learning using real training data. The monitoring device 202 may use any appropriate machine learning algorithm, including Random Forests or a boosted generalized linear model with connections as variables and node anomaly scores as the predictor.

The monitoring device 202 may use any appropriate algorithm to create the network model and/or to categorize one or more devices, e.g., as having a high node anomaly score or a low node anomaly score. For instance, modules included in the monitoring device 202, e.g., used to categorize devices, can be modular to allow replacement with a different module that uses a different model, set of models, and/or probabilistic forecasts. The monitoring device 202 may use the same module or a different module to categorize the connections and the devices. One requirement for the module may be that the module outputs a probability, e.g., between zero and one, that represents whether or not network traffic with a device is anomalous.

In some implementations, the monitoring device 202 may use a Bayesian Inference Network, machine learning, or any other appropriate algorithm to determine a network anomaly score or a subnet anomaly score using the node anomaly scores for the devices include in the network or the subnet.

The monitoring device 202 may examine the data and/or header of packets, e.g., use deep packet inspection, to create the network model and/or categorize one or more connections. When the monitoring device 202 uses deep packet inspection, the monitoring device 202 may maintain the privacy of data contained within inspected packets. For instance, when the monitoring device 202 detects anomalous activity, the monitoring device 202 may anonymize any data that could be used to identify a user prior to presenting information about the anomalous activity to a user, e.g., without loss of data that may identify a potential source of an attack. If the monitoring device 202 does not use deep packet inspection, the analysis of network traffic by the monitoring device 202 may be faster, e.g., closer to real-time analysis.

The monitoring device 202 may generate one or more events in response to a detected high anomaly score or a detected anomaly score that is not low. For instance, an event may be the presentation of the high anomaly score in the user interface 204, a disconnection of a device corresponding with the high node anomaly score from the network 212, or the creation of a computer-implemented network rule to eliminate the anomalous network traffic, e.g., computer-implemented firewall logic, described in more detail below.

In some implementations, another device may generate and/or train the network model and provide the network model to the monitoring device 202. For instance, a server in the network 212 may generate the network model offline and provide the network model to the monitoring device 202.

The devices 210a-f may include personal computers, mobile communication devices, and other devices that can send and receive data over the network 212. The network 212, such as a local area network (LAN), wide area network (WAN), the Internet, or a combination thereof, connects the user devices 210a-f and the gateways 206a-b.

The external network 214 may be a LAN, WAN, the Internet, or a combination thereof. The external network 214 connects one or more devices outside of an organizations network, e.g., the network 212, with the devices 210a-f.

In some implementations, the monitoring device 202 may be part of another network device. For example, the monitoring device 202 may be part of the gateway 206a or an intrusion detection system.

Figure 3A:
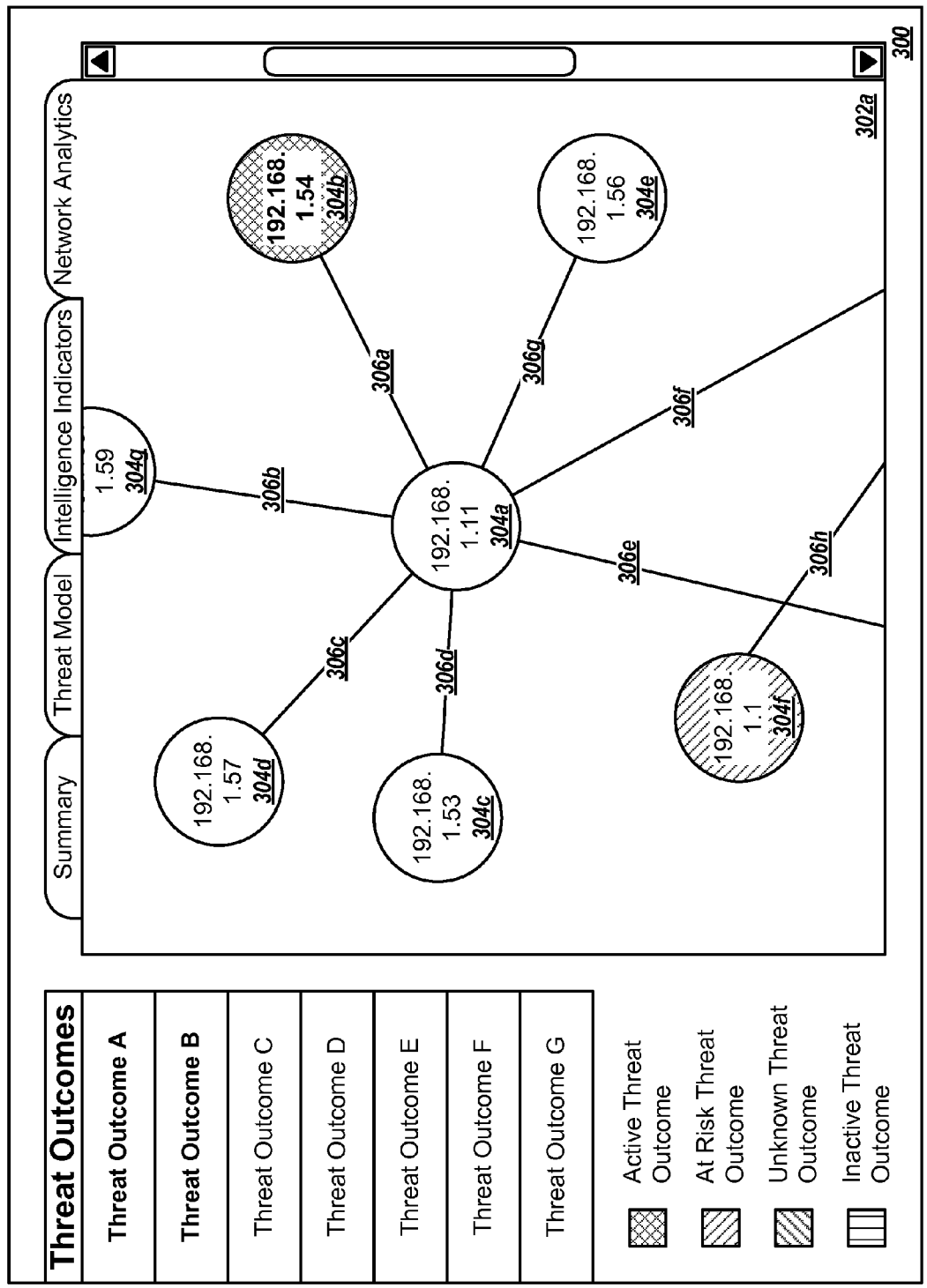
FIGS. 3A-B show an example user interface for presenting network anomaly information.
Figure 3B:
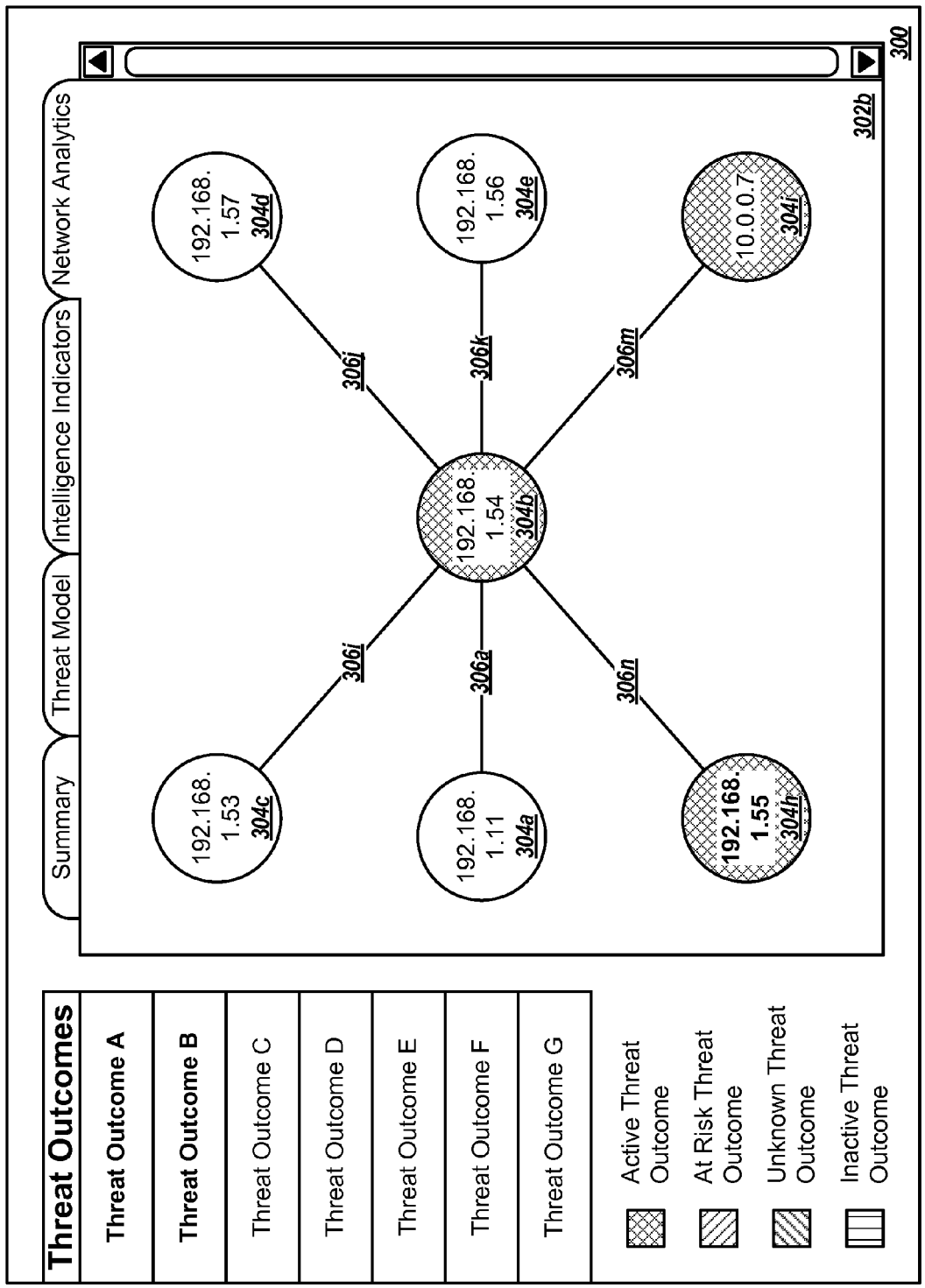

FIGS. 3A-B show an example user interface 300 for presenting network anomaly information. The user interface 300 includes a node map 302a, shown in FIG. 3A, with multiple nodes 304a-g that each represents a network connected device, with the nodes 304a-g connected with edges 306a-h that represent logical connections between the nodes 304a-g.

The node map 302a may represent direct connections between devices in a network, such as the network 212. For instance, each of the edges 306a-h represents a direct connection, such as a cable or a wireless connection, between two devices. The IP addresses of the devices are identified as the label of the corresponding node 304a-g. The user interface 300 may use any appropriate identifier as the labels of the nodes 304a-g, e.g., MAC addresses, hardware addresses, or another name, label or identifier assigned to the respective nodes 304a-g.

Each of the nodes 304a-g includes a representation of a node anomaly score, such as a low node anomaly score or a high node anomaly score. The node anomaly scores may be represented by numerical values for the nodes, e.g., below the corresponding IP addresses, text labels for the nodes, the colors of the nodes, or the shading of the nodes in the node map 302a. For instance, a diagonal cross hatch for a node may indicate that the corresponding node has a high probability of an active threat based on a high node anomaly score or a node anomaly score that is not low. In some examples, the colors may include red, yellow, and green, that indicate the probability of anomalous activity of the corresponding node based on multiple threshold values, e.g., specified by an operator of the user interface 300. The threshold values may be specific to a particular instance of the user interface 300, e.g., different companies may use different threshold values. The user interface 300 may include different threshold values for edges, nodes, networks and/or subnets.

The numerical values for anomaly scores may be score values, probabilities that communications for the corresponding node are anomalous, or a distance from a mean communication value. For example, when a quantity of network communication packets varies from the average quantity by twice the standard deviation, the numerical value presented in the node map 302a may be two. In some examples, when the quantity of network communication packets varies from the average quantity by five, the numerical value presented in the node map 302a may be five. The numerical value presented in the node map 302a may also include the expected value, e.g., the average quantity of network communication packets. Any appropriate identifier may be used to represent the anomaly scores in the node map 302a, e.g., a value that is the same as the determined anomaly score or a value that represents the determined anomaly score.

When a user viewing the user interface 300 selects a node, such as the node 304b, the user interface 300 may indicate the selected node, e.g., by presenting the IP address of the selected node in a bold font. The user interface 300 may indicate the selection of the node using any appropriate algorithm. When the selected node does not have a low node anomaly score, e.g., and may be at risk, the user interface 300 may present additional information about the node, such as a type of threat outcome. For instance, when the node 304b, which is shown as having an active threat outcome, is selected, the user interface 300 may indicate that the node 304b has a high probability of a particular type of threat outcome, e.g., threat outcome A and threat outcome B.

The user interface 300 may include an identification of an at risk threat outcome, which indicates that a corresponding node does not currently have an active threat but the network traffic through the device represented by the node is anomalous, e.g., as may be indicated by a throughput anomaly score. For instance, the node 304b with a high node anomaly score may correspond with a device that has both a new connection, e.g., with another device to which the device is not normally connected, and a greater packet throughput than normal, e.g., over a particular period of time. The greater packet throughput may only be for the new connection or may be across multiple connections of the device.

Another node 304f, that corresponds to different device, may have a throughput anomaly score based on a greater packet throughput than normal and be at risk but not yet an active threat. For example, if the greater packet throughput for the different device continued over an extended period of time, the other node 304f may be assigned a high node anomaly score. In some examples, if the greater packet throughput varies from an expected packet throughput for the other node by a value between a first threshold value, e.g., one standard deviation, and a second threshold value, e.g., two standard deviations, the monitoring device may assign the other node a throughput anomaly score. If the variation from the expected packet throughput was more than the second threshold value, e.g., two standard deviations, the monitoring device may assign the other node a high node anomaly score.

A node may be assigned an unknown threat outcome when the node has a node anomaly score below a score representing an at risk threat outcome but greater than no threat outcome. The unknown threat outcome may be assigned to a node that corresponds with a device that was recently added to a network, e.g., and a network model does not have enough data about the device type or communications with the device to determine normal versus abnormal network traffic for the device.

The user interface 300 may receive an indication to present additional details about the node 304b, e.g., in response to a user single left clicking or double clicking on the node or selecting a menu option for additional details about the node 304b. The user interface 300, in response, presents another node map 302b, shown in FIG. 3B, with details for the selected node 304b. The other node map 302b includes the selected node 304b in the center of the node map and displays nodes and edges for the devices with which the selected node 304b communicates. For instance, the other node map 302b indicates the nodes 304a-e and 304h-i with which the selected node 304b communicates, e.g., and the nodes correspond with devices that are a final endpoint of communications with the selected node, either an initial source or a final destination.

The other node map 302b does not indicate other devices that may transfer packets between the source and destination devices that do not communicate with the device itself. For example, the other node map 302b includes a node 304a that may correspond with a gateway or router to which the selected device, e.g., represented by the selected node 304b, is connected, but does not include nodes for a firewall or other devices that transfer packets to an external device, represented by a node 304i, with which the selected device does not otherwise communicate.

The other node map 302b provides details of the selected node 304b, such as the edges used to calculate the node anomaly score for the selected node 304b. The other node map 302b may include the edge anomaly scores above the corresponding edges. For instance, when the selected node 304b has a high node anomaly score and an active threat outcome, the other node map 302b may highlight edges 306m-n as having anomalous activity while not highlighting edges 306a and 306i-k.

The user interface 300 may receive another indication of selection of an edge or a corresponding node, such as another node 304h, and present details about the edge or node, e.g., one or more potential threat outcomes described above.

The user interface 300 may receive input indicating a request for a menu of actions available for a particular device in response to a high node anomaly score, or a node anomaly score that is not low. For instance, the user interface may receive input indicating a right click on the selected node 304b or the other node 304h with which communications are anomalous. In response, the user interface 300 may present the menu of actions to allow a user to redirect some of the communications from the particular device to another device, black-hole, e.g., silently discard or redirect, traffic to or from the particular device, quarantine or disable the particular device, block traffic to and/or from the particular device, disconnect the particular device from the network, create a computer-implemented network rule for communications with the particular device, transition an application executing on the particular device to another device, or adjust network mapping tables, to name a few examples.

A system may redirect communications from the particular device to another device, e.g., prior to preventing the particular device from sending and/or receiving network traffic. For instance, when the particular device executes a critical application, the system may move the execution of the application, e.g., and a state of the application, to the other device and redirect communications to the other device so that the other device responds to data requests, e.g., when the critical application is a web server.

The system may create a computer-implemented network rule for communications with the particular device to prevent the particular device from creating anomalous connections, e.g., with other devices on the same network or an external network. The computer-implemented network rule may be a mitigating control, such as a software-defined networking (SDN) policy, an intrusion prevent signature, computer-implemented firewall logic, or a computer-implemented communication rule executed on the particular device, indicating that all packets received from certain other devices, certain ports, and/or using certain transport protocols should be dropped.

The particular device may be quarantined to prevent the particular device from communicating with other devices, e.g., except for network security devices. The particular device may be disabled, e.g., turned off. The network connection servicing the particular device may be disabled, preventing all network communication with the particular device until the network connection is re-enabled. The network connection may be limited in some fashion, such as by controlling a level of allowed inbound or outbound bandwidth. Bandwidth control may be on a port or traffic type basis.

The user interface 300 may be updated in real-time or in near real-time. For instance, the user interface 300 may present an anomaly score to a user and the data used to determine the anomaly score, e.g., the corresponding threat outcomes, to allow the user to analyze the data without changes to the user interface 300. The user interface 300 may include a refresh button and, in response to receipt of user selection of the refresh button, the user interface 300 presents updated anomaly scores. In some examples, when the monitoring device determines an update to an anomaly score, the user interface 300 may automatically refresh and present the updated anomaly score without user input, e.g., without user selection of a refresh button.

The user interface 300 may present additional details about a node. For instance, the user interface 300 may include the type of node, the expected transport protocols for communications with the node, expected quantity and/or packet size, transmission type, device vendor, MAC address, firmware or operating system version, business function, and/or contact information for a user operating the device that corresponds with the node or an administrator with physical access to the device. The contact information may allow a user of the user interface 300 to troubleshoot the anomalous activity for a node and determine a solution to eliminate the anomalous activity, e.g., over the phone.

Figure 4:
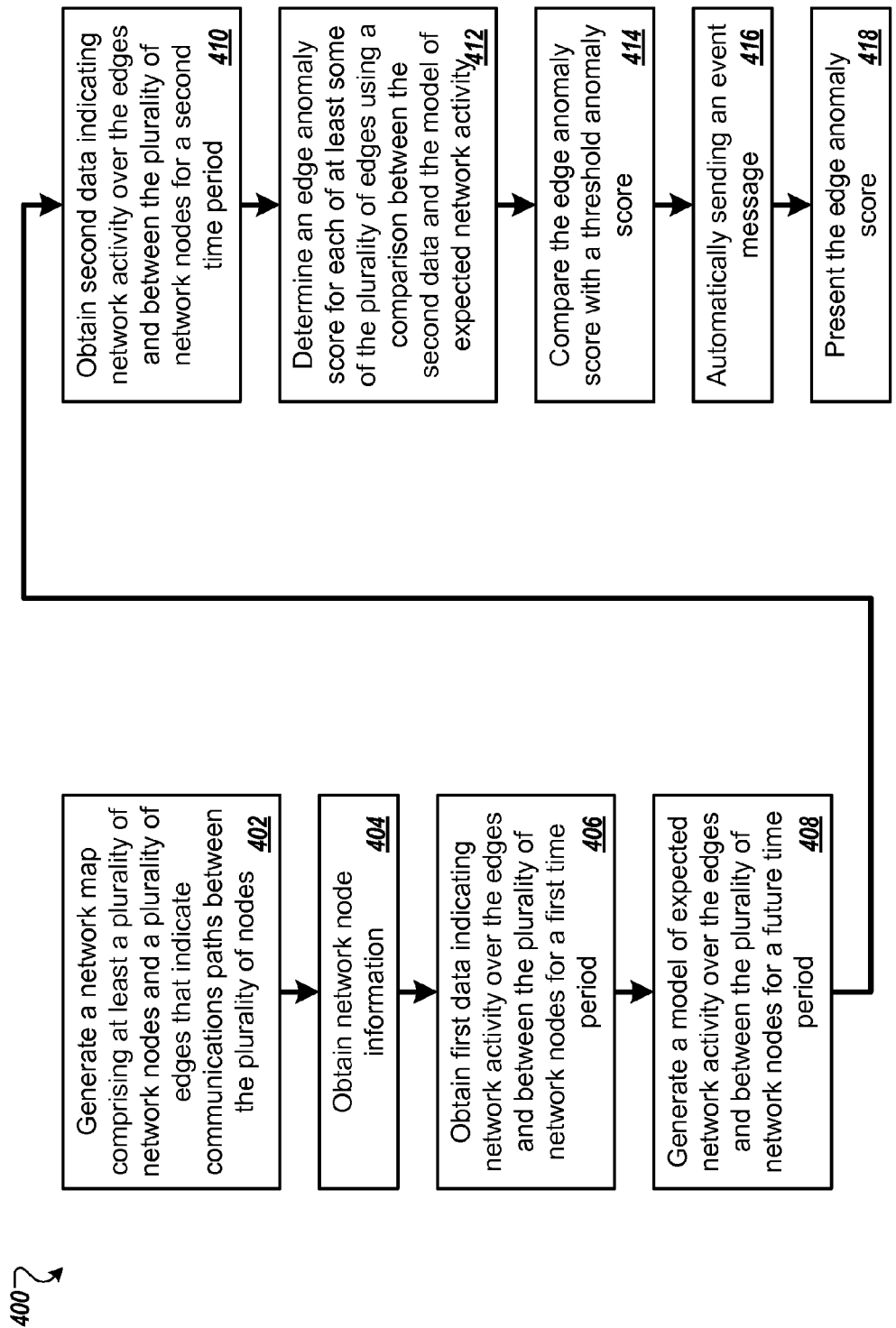
FIG. 4 is a flow diagram of a process for determining an edge anomaly score.

FIG. 4 is a flow diagram of a process 400 for determining an edge anomaly score. For example, the process 400 can be used by the monitoring device 202 from the system 200.

The process generates a network map comprising at least a plurality of network nodes and a plurality of edges that indicate communications paths between the plurality of nodes (402). For example, the network map indicates which network devices, e.g., nodes, communicate with each other, e.g., and the communications are represented by the edges.

The process obtains network node information (404). For example, the monitoring device may determine a type of each node, such as a printer, copier, scanner, desktop computer, or telephone, to name a few.

The monitoring device may determine expected communications for a node using the type of the node. For instance, a telephone may be expected to communicate with other telephones and personal computers, e.g., executing voice over IP applications, and a printer may be expected to communicate with personal computers, but not other printers or any telephones.

In some implementations, the monitoring device may receive ontological data that predefines expected behavior for one or more of the nodes. For example, the ontological data may indicate that a printer only receives one-to-many communications and does not communicate with devices except for laptops, desktops, and/or endpoint nodes. In some examples, the ontological data may indicate that an Active Directory server is only queried by Windows™ endpoint devices via Lightweight Directory Access Protocol (LDAP).

The process obtains first data indicating network activity over the edges and between the plurality of network nodes for a first time period (406). For example, the monitoring device receives network traffic from one or more gateways and other devices that mirror the network traffic to the monitoring device. The monitoring device may receive data over a period of time longer than the first time period, e.g., days, weeks, or months, and separate the data into subsets each of which represent a time interval with the same duration, e.g., the first time period. The first data may be Netflow data, network log data, or another appropriate type of historical network data.

The process generates a model of expected network activity over the edges and between the plurality of network nodes for a future time period (408). The monitoring device uses the network traffic, and potentially the network node information, to generate a network model that represents historical network activity of the network devices. The model may represent expected network activity for time periods with the same duration as the first period of time, for particular times during the day, e.g., when network traffic is higher during the day than the evening, and/or for particular times in a month or in a year.

The process obtains second data indicating network activity over the edges and between the plurality of network nodes for a second time period (410). For instance, the monitoring device continuously receives mirrored data from the gateways and other devices and analyzes the received data. The data may be for a particular period of time, e.g., with the same duration as the first time period. The monitoring device may analyze the received data to determine statistical information for network traffic over a particular period of time, e.g., with the same duration as the first time period.

In some examples, the monitoring device analyzes all data for a particular connection with a particular device to determine the total throughput on the connection over the particular period of time, the total quantity of packets sent and/or received across the connection over the particular period of time, whether packets were sent to and/or received from another device with which the particular device does not normally communicate, and/or a total quantity of packets that were sent to and/or received from another device with which the particular device does not normally communicate. The total quantity of packets that were sent to and/or received from the other device with which the particular device does not normally communicate may be multiple quantities, e.g., a first quantity of packets sent and a second quantity of packets received and/or a first quantity for a first other device and a second quantity for a second other device, or a single quantity, e.g., for both packets sent and received and for all other devices with which the particular device does not normally communicate. The monitoring device may use the model of expected network activity to determine the other devices with which the particular device does not normally communicate.

The process determines an edge anomaly score for each of at least some of the plurality of edges using a comparison between the second data and the model of expected network activity (412). For example, the monitoring device may compare the average, median, and/or standard deviation of a current packet size or a current packet quantity with the expected corresponding value, identified in the model of expected network activity, to determine the edge anomaly score. If any of the values varies from the expected value by more than a threshold amount, the monitoring device may assign the edge a higher edge anomaly score. For instance, if the average current packet size varies from the expected average packet size by more than the expected standard deviation, the monitoring device may assign the corresponding edge a high edge anomaly score.

The monitoring device may use a transport protocol, a communication port, a transmission type, e.g., unicast, broadcast, multicast, etc., and whether the communication is encrypted or not to determine the edge anomaly score. For example, when communications with a particular device are never encrypted, an encrypted communication may be indicative of anomalous network activity and the monitoring device may assign the particular device a high node anomaly score. When the monitoring device determines that a communications channel between the particular device and another device is using a different transport protocol or communication port than normal, the monitoring device may assign the particular device a high node anomaly score.

The process compares the edge anomaly score with a threshold edge anomaly score (414). For example, the monitoring device compares the edge anomaly score with a threshold edge anomaly score that is specific to a particular connection, type of connection, or for all connections.

The process sends an event message (416). For instance, the monitoring device may send the event message without user intervention, e.g., automatically, when the edge anomaly score is greater than the threshold edge anomaly score. The event message may alert a user to the edge anomaly score or may cause the performance of some other automated action, such as the creation of a computer-implemented network rule, automatic disconnection of the node from the network, or transfer of an application from the particular device to another device. The event message may be presented in a user interface, include an event pushed to a security information and event management (SIEM) system or another logging tool, or may include an email or short message service (SMS) message, to name a few examples. A user device, in response to input from a user, may reply to the event message, e.g., reply to the email or SMS message, with instructions for an action to perform based on the edge anomaly score. The action may include disconnection of a device that uses a connection corresponding to the edge anomaly score or blocking traffic on the connection, to name a few examples.

In some implementations, the monitoring device, or another device, performs additional analysis of the particular node in response to a determination that the edge anomaly score is greater than the threshold edge anomaly score. For example, the other device may perform a more thorough analysis of the device that corresponds with the node, such as a virus scan or another appropriate type of scan. The device may perform remediation in response to the results of the additional analysis.

The process presents the edge anomaly score (418). For example, the monitoring device receives user input requesting presentation of the edge anomaly score and presents the edge anomaly score on a display, e.g., in a user interface, prints the edge anomaly score on paper, or publishes the edge anomaly score on a website.

The order of steps in the process 400 described above is illustrative only, and the determination of the edge anomaly score can be performed in different orders. For example, the monitoring device, or another device, may obtain the network node information, e.g., step 404, prior to generating the network map, e.g., step 402.

In some implementations, the process 400 can include additional steps, fewer steps, or some of the steps can be divided into multiple steps. For example, the process may include steps 406 through 412 and not steps 402 through 404 or steps 414 through 418.

Figure 5:
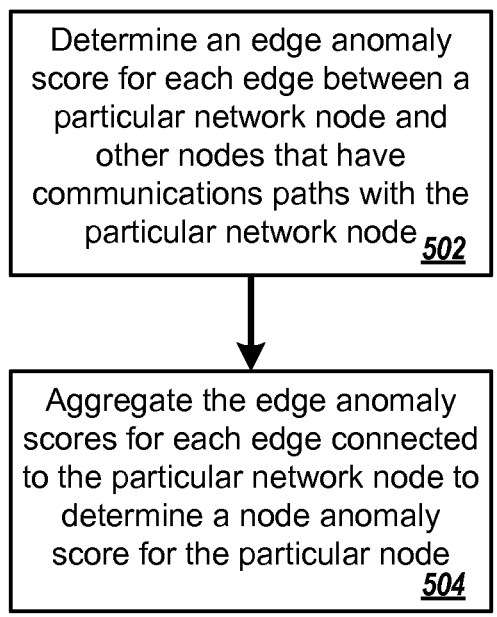
FIG. 5 is a flow diagram of a process for determining a node anomaly score.

FIG. 5 is a flow diagram of a process 500 for determining a node anomaly score. For example, the process 500 can be used by the monitoring device 202 from the system 200.

The process determines an edge anomaly score for each edge between a particular network node and other nodes that have communications paths with the particular network node (502). For example, the monitoring device may perform step 412, described above, for each of the edges that represent communications paths with the particular network node.

The process aggregates the edge anomaly scores for each edge connected to the particular network node to determine a node anomaly score for the particular node (504). For instance, the monitoring device may use Bayesian Inference or another appropriate statistical inference method to aggregate the edge anomaly scores and generate the node anomaly score.

In some implementations, the monitoring device uses an average of the edge anomaly scores as the node anomaly score. In some implementations, the edge anomaly score for the particular node may be a sum or a product of the edge anomaly scores for the edges that connect to the particular network node.

In some implementations, the process 500 can include additional steps, fewer steps, or some of the steps can be divided into multiple steps. For example, the monitoring device may perform the process 500 as part of the process 400, compare the node anomaly score with a threshold node anomaly score, e.g., similar to step 414, and present the node anomaly score, e.g., step 418. In this example, the threshold node score may be specific to a particular node, type of node, or may be the same for all nodes.

The monitoring device may aggregate multiple node anomaly scores to determine a network anomaly score or a subnet anomaly score using all nodes for devices on a corresponding network or in a corresponding subset, respectively. A process to perform the aggregation of multiple node anomaly scores to determine the network anomaly score or the subnet anomaly score may be similar to the process 500 but with the aggregation of node anomaly scores, instead of edge anomaly scores, to determine the network anomaly score or the subnet anomaly score.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 6:
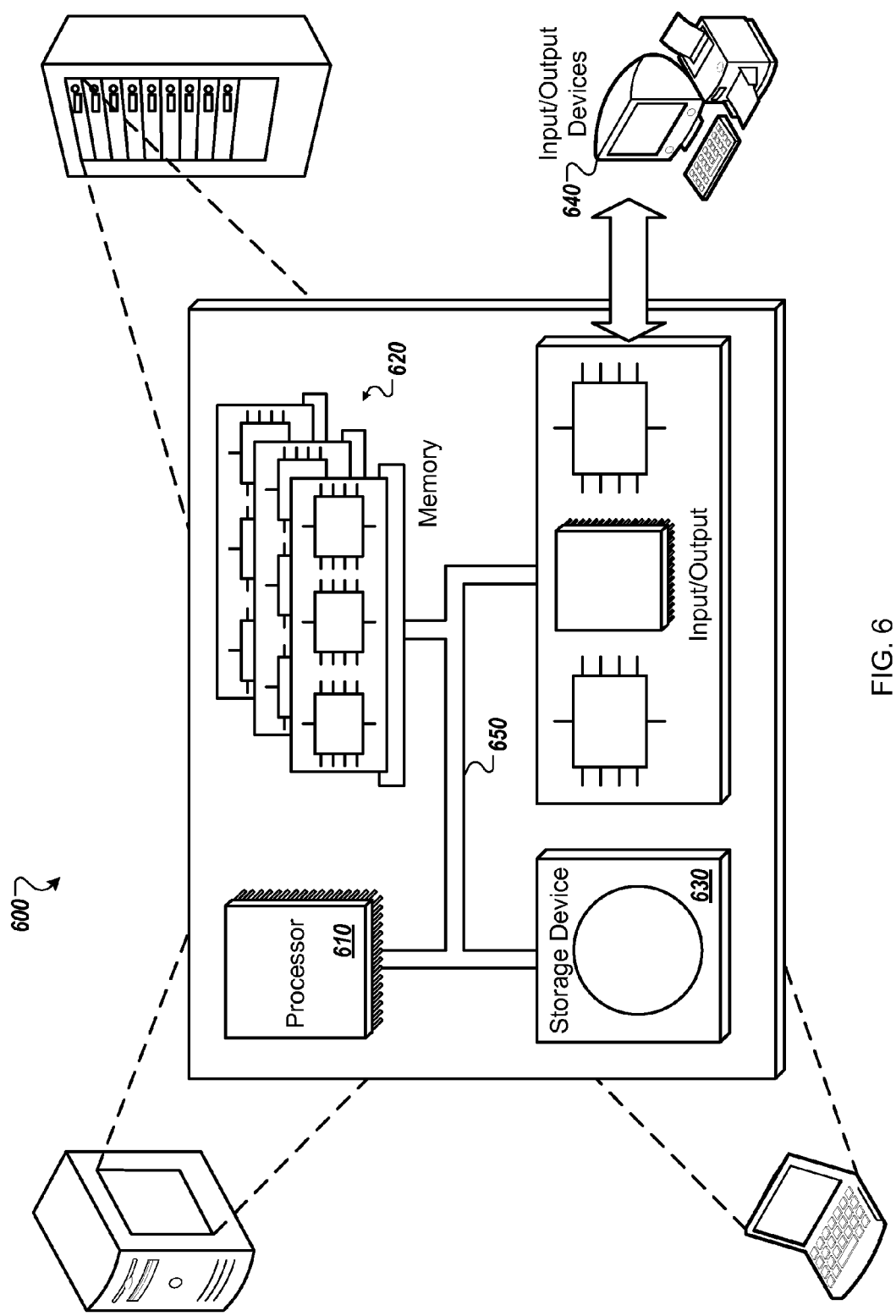
FIG. 6 is a block diagram of a computing system that can be used in connection with computer-implemented methods described in this document.

An example of one such type of computer is shown in FIG. 6, which shows a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method, comprising:
generating, by one or more computers, a network map comprising at least a plurality of network nodes and a plurality of edges that each indicate a communications path between two nodes from the plurality of network nodes;
obtaining, by at least one of the one or more computers, network node information comprising an indication of a node type for each of the plurality of network nodes and network activity data indicating typical network activity for each of the node types;
obtaining, by at least one of the one or more computers, first data indicating network activity over the edges and between the plurality of network nodes for a first time period;
generating, by at least one of the one or more computers, a model of expected network activity over the edges and between the plurality of network nodes for a future time period using the network map, the network node information, and the first data;
obtaining, by at least one of the one or more computers, second data indicating network activity over the edges and between the plurality of network nodes for a second time period;
determining, by at least one of the one or more computers and for a particular network node from the plurality of network nodes, an edge anomaly score for each of the edges between the particular network node and the other network nodes in the plurality of network nodes that have communications paths with the particular network node using a comparison between the second data and the model of expected network activity, each of the edge anomaly scores representing a probability that the corresponding edge connected to the particular network node is anomalous; and
aggregating, by at least one of the one or more computers, the edge anomaly scores for each edge connected to the particular network node to determine a node anomaly score for the particular network node.

2. The method of claim 1, wherein aggregating the edge anomaly scores for each edge connected to the particular network node to determine the node anomaly score comprises aggregating the edge anomaly scores using Bayesian inference.

3. The method of claim 1, wherein using the comparison between the second data and the model of expected network activity comprises determining whether the second data indicates that the particular network node is using a given edge to a) send to a second node larger packets than expected packet sizes identified in the model of expected network activity for the given edge or b) communicate with a second node using different network protocols than expected network protocols identified in the model of expected network activity for the given edge.

4. The method of claim 1, wherein a duration of the first time period, a duration of the future time period, and a duration of the second time period are all the same duration.

5. The method of claim 1, comprising determining whether a particular node anomaly score for the particular network node is greater than a threshold anomaly score.

6. The method of claim 5, comprising sending an event message upon determining that the particular node anomaly score for the particular network node is greater than the threshold anomaly score.

7. The method of claim 6, comprising receiving a reply to the event message that indicates one or more actions to perform in response to determining that the particular node anomaly score for the particular network node is greater than the threshold anomaly score.

8. The method of claim 7, comprising performing at least one of the actions with respect to the particular network node that corresponds with the particular node anomaly score.

9. The method of claim 5, comprising performing at least one action with respect to the particular network node in response to determining that the particular node anomaly score for the particular network node is greater than the threshold anomaly score.

10. The method of claim 9, wherein the at least one of the actions comprises at least one of presenting information to a user about the particular network node, disconnecting the particular network node from a network, restricting inbound or outbound bandwidth of the particular network node, preventing the particular network node from sending or receiving particular types of network traffic, rerouting network traffic that has the particular network node as a destination, quarantining the particular network node, disabling the particular network node, creating a computer implemented network rule for the particular network node, silently discarding at least a portion of the network traffic corresponding to the particular network node, transitioning an application executing on the particular network node to a second network node, or blocking network traffic that has the particular network node as a destination.

11. The method of claim 1, wherein aggregating the edge anomaly scores for each edge connected to the particular network node to determine the node anomaly score for the particular network node comprises:
   determining, by at least one of the one or more computers and for a particular network node from the plurality of network nodes, a standard deviation of a packet size or a packet quantity of the particular network node using the model of expected network activity; and
   determining the node anomaly score for the particular network node using the standard deviation and the second data.

12. A non-transitory computer storage medium encoded with instructions that, when executed by a user device, cause the user device to perform operations comprising:
   generating, by one or more computers, a network map comprising at least a plurality of network nodes and a plurality of edges that each indicate a communications path between two nodes from the plurality of network nodes;
   obtaining, by at least one of the one or more computers, network node information comprising an indication of a node type for each of the plurality of network nodes and network activity data indicating typical network activity for each of the node types;
   obtaining, by at least one of the one or more computers, first data indicating network activity over the edges and between the plurality of network nodes for a first time period of a first length;
   generating, by at least one of the one or more computers, a model of expected network activity over the edges and between the plurality of network nodes for a future time period of the first length using the network map, the network node information, and the first data;
   obtaining, by at least one of the one or more computers, second data indicating network activity over the edges and between the plurality of network nodes for a second time period of the first length;
   determining, by at least one of the one or more computers and for a particular network node from the plurality of network nodes, an edge anomaly score for each of the edges between the particular network node and the other network nodes in the plurality of network nodes that have communications paths with the particular network node using a comparison between the second data and the model of expected network activity, each of the edge anomaly scores representing a probability that the corresponding edge connected to the particular network node is anomalous; and
   aggregating, by at least one of the one or more computers, the edge anomaly scores for each edge connected to the particular network node to determine a node anomaly score for the particular network node.

13. The non-transitory computer storage medium of claim 12, wherein the operations comprise:
   comparing the node anomaly score with a threshold anomaly score; and
   sending an event message upon determining that the node anomaly score is greater than the threshold anomaly score.

14. The non-transitory computer storage medium of claim 12, wherein aggregating the edge anomaly scores for each edge connected to the particular network node to determine the node anomaly score for the particular network node comprises:
   determining, by at least one of the one or more computers and for a particular network node from the plurality of network nodes, a standard deviation of a packet size or a packet quantity of the particular network node using the model of expected network activity; and
   determining the node anomaly score for the particular network node using the standard deviation and the second data.

15. The non-transitory computer storage medium of claim 12, wherein the operations comprise:
   aggregating a plurality of node anomaly scores for each node in a particular network or a particular subnet, including the node anomaly score for the particular network node, to determine a network anomaly score for the particular network or a subnet anomaly score for the particular subnet.

16. The non-transitory computer storage medium of claim 12, the operations comprising determining whether the node anomaly score for the particular network node is greater than a threshold anomaly score.

17. The non-transitory computer storage medium of claim 16, the operations comprising performing at least one action with respect to the particular network node in response to determining that the particular node anomaly score for the particular network node is greater than the threshold anomaly score.

18. The non-transitory computer storage medium of claim 16, the operations comprising sending an event message in response to determining that the particular node anomaly score for the particular network node is greater than the threshold anomaly score.

19. The non-transitory computer storage medium of claim 18, the operations comprising receiving a reply to the event message that indicates one or more actions to perform in response to determining that the particular node anomaly score for the particular network node is greater than the threshold anomaly score.

20. The non-transitory computer storage medium of claim 19, the operations comprising performing at least one of the actions with respect to the particular network node that corresponds with the particular node anomaly score in response to receiving the reply to the event message.

21. The non-transitory computer storage medium of claim 12, wherein using the comparison between the second data and the model of expected network activity comprises determining whether the second data indicates that the particular network node is using a given edge to a) send to a second node larger packets than expected packet sizes identified in the model of expected network activity for the given edge or b) communicate with a second node using different network protocols than expected network protocols identified in the model of expected network activity for the given edge.

* * * * *

UNITED STATES PATENT AND TRADEMARK OFFICE
CERTIFICATE OF CORRECTION

| | | |
|---|---|---|
| PATENT NO. | : 9,503,467 B2 | Page 1 of 1 |
| APPLICATION NO. | : 14/285487 | |
| DATED | : November 22, 2016 | |
| INVENTOR(S) | : Michael L. Lefebvre et al. | |

It is certified that error appears in the above-identified patent and that said Letters Patent is hereby corrected as shown below:

On the Title Page

Column 1, item (72) Inventors:, Line 1, change "Michael J. Lefebvre" to -- Michael L. Lefebvre --.

Signed and Sealed this
Seventh Day of February, 2017

Michelle K. Lee
*Director of the United States Patent and Trademark Office*